Figure 1:
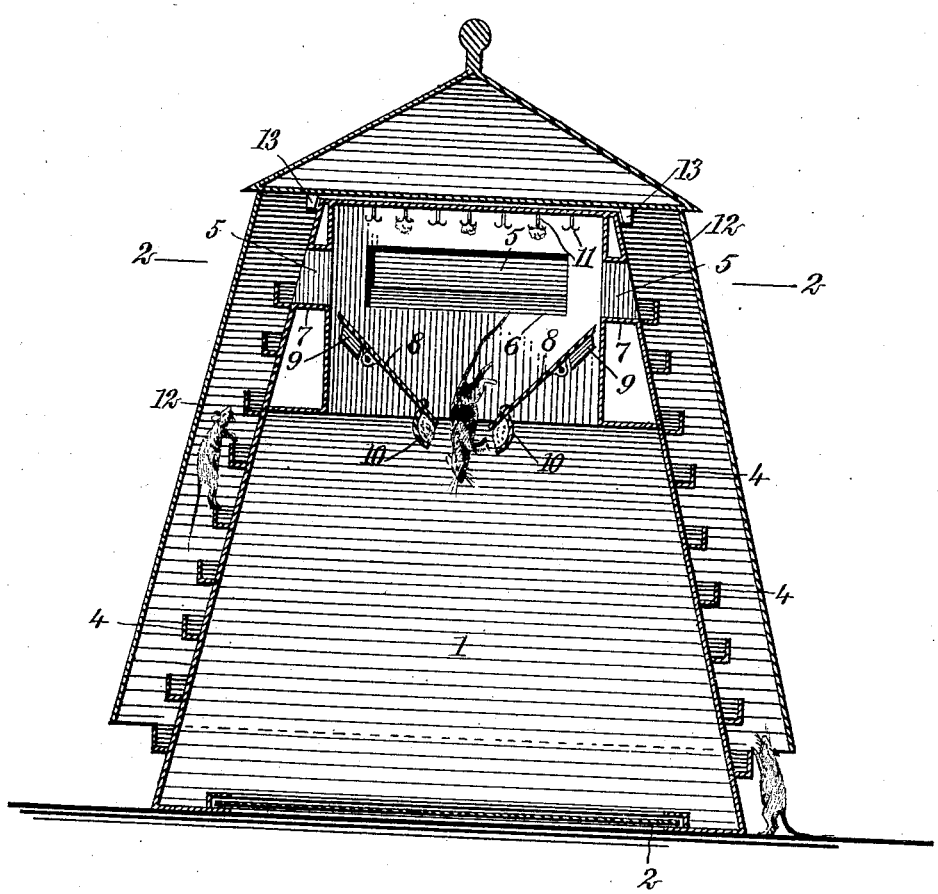

W. M. KAISER.
ANIMAL TRAP.
APPLICATION FILED AUG. 26, 1908.

915,028.

Patented Mar. 9, 1909.
2 SHEETS—SHEET 1.

WITNESSES

INVENTOR
William M. Kaiser
BY
ATTORNEYS

W. M. KAISER.
ANIMAL TRAP.
APPLICATION FILED AUG. 26, 1908.
915,028.
Patented Mar. 9, 1909.
2 SHEETS—SHEET 2.
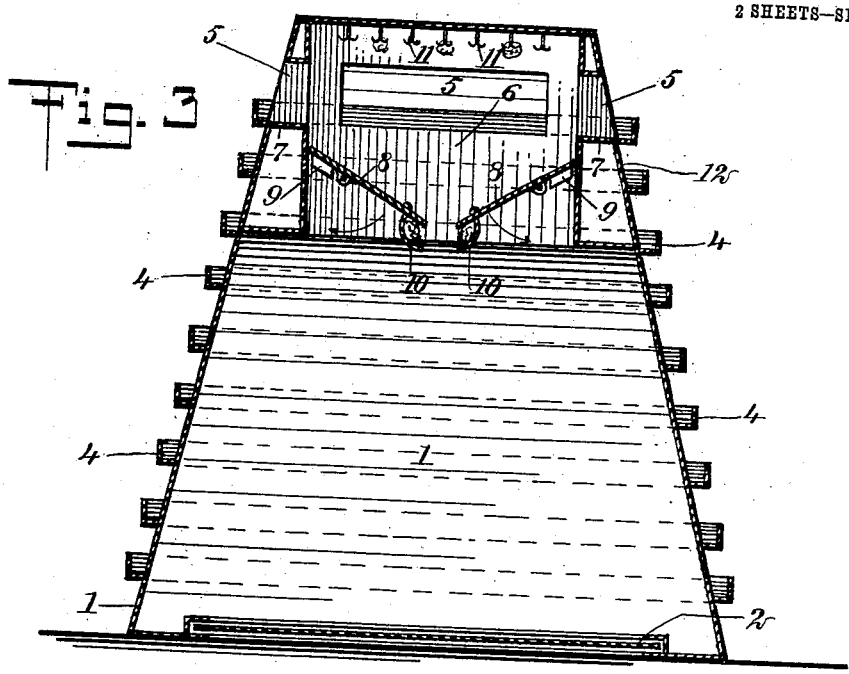
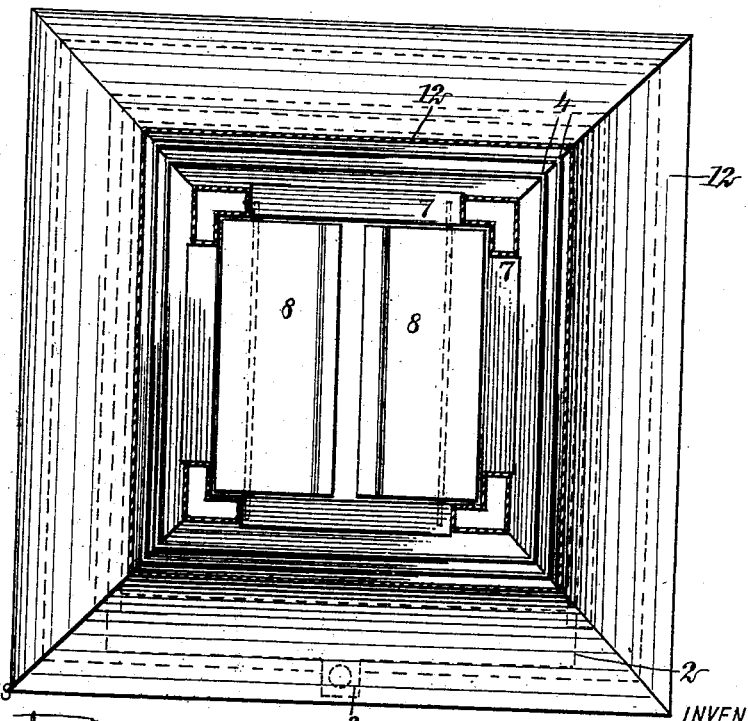
WITNESSES
INVENTOR
William M. Kaiser
BY
ATTORNEYS

UNITED STATES PATENT OFFICE.

WILLIAM M. KAISER, OF BERKELEY, CALIFORNIA.

ANIMAL-TRAP.

No. 915,028.　　　　　Specification of Letters Patent.　　　Patented March 9, 1909.

Application filed August 26, 1908. Serial No. 450,276.

*To all whom it may concern:*

Be it known that I, WILLIAM M. KAISER, a citizen of the United States, and a resident of Berkeley, in the county of Alameda and State of California, have invented a new and Improved Animal-Trap, of which the following is a full, clear, and exact description.

My invention relates to animal traps, and has for its object to provide a rat trap, in which there is a receptacle around which are disposed run-ways serving as steps which lead to a bait room, in which are pivoted trap doors which are held yieldingly in substantially a horizontal position, there being an opening between the trap doors when they are so disposed, and near the said opening and secured to the under side of one of the trap doors is disposed a bait receptacle. The receptacle is adapted to contain water or acid; and the trap is inclosed by a hood or cover which darkens the bait room and the run-ways leading thereto. At the bottom of the receptacle, there is a slide by which it is possible to remove the dead rats.

Other objects will be disclosed in the following complete description of the invention.

In this specification, I will describe the preferred form of my invention, but it will be understood that I do not limit myself thereto, as I consider myself entitled to all forms and embodiments of the invention which may be held to fall within the scope of the appended claims.

Reference is to be had to the accompanying drawings, forming a part of this specification, in which similar characters of reference indicate corresponding parts in all the figures, in which—

Figure 1 is a vertical sectional view of the trap; Fig. 2 is a horizontal section on the line 2—2 of Fig. 1, and Fig. 3 is a view similar to Fig. 1 but with the hood removed.

By referring to the drawings, it will be seen that a receptacle 1 is provided, the said receptacle preferably having flat sides which converge upwardly, and in the bottom of the receptacle there is a slide 2 having a handle 3, and by withdrawing the slide the dead rats in the receptacle may be removed. Running completely around the converging sides of the receptacle are series of run-ways 4, which serve as steps leading to openings 5 in the sides of the receptacle, these openings 5 connecting the run-ways with a bait room 6, disposed at the top of the receptacle. The bait room 6 and the openings 5 have floors 7 connecting the upper run-ways 4 with trap-doors 8 at the bottom of the bait room. Each of these two trap-doors 8 is pivoted to the walls of the bait room 6, the trap-doors 8 being pivoted near their outer ends, so that their inner ends will have a tendency to fall. By means of weights 9 the trap-doors are held substantially in a horizontal position, but as the weights 9 are not heavy, the weight of a small animal is sufficient to cause the inner ends of the trap-doors 8 to fall, thereby causing the animal to fall into the receptacle. When the trap-doors 8 are substantially in a horizontal position, there is an opening therebetween, and on the under side of the trap-doors, near this opening, are secured bait-holders 10, and there are also bait-holders 11 at the top of the receptacle.

Completely inclosing the receptacle 1 there is a hood 12, the sides of the hood 12 corresponding with the converging sides of the receptacle 1, there being blocks 13 at the top of the hood, these blocks fitting against the uppermost sides of the receptacle 1, to hold the hood 12 in proper position relatively to the receptacle. When the hood 12 is in position, the run-ways 4 are inclosed and darkened thereby, as is also the bait room 6, but the hood 12 may be removed to bait the trap. It is very important that the run-ways and the bait be darkened, for rats do not care to frequent places which are exposed to the light; and I have found by experience that the run-ways arranged as has been described and the hood darkening them, are attractive places for rats to collect, even without the bait in the bait room, but that with bait in the bait room, the rats will gather in the run-ways and travel upwardly to the bait room, from whence they will enter through the openings 5 to the trap-doors 8, and inasmuch as a strong bait is used in the bait hooks 10 at the under side of the trap-doors 8, the rats will be attracted to the innermost ends of the trap-doors 8, and the weight of the rats will cause the inner ends of the trap-doors to fall, thereby throwing the rats into the receptacle, which may contain water or acid, which will quickly destroy the rats and prevent their noise being heard.

As the rats are not able to reach the bait, it is necessary to renew it only at long intervals. It will be understood that when the bait holders are filled up with the bait, the bait will remain untouched by the rats, and as it cannot fall out, the bait need not be renewed for several weeks.

Having thus described my invention, I claim as new and desire to secure by Letters Patent:

1. In an animal trap, a frame forming a receptacle, the frame having upwardly converging sides, a series of runways disposed around the said sides, a trap-door in close proximity to one of the run-ways, the trap-door being pivoted to the frame, means to hold the trap-door in substantially a horizontal position, and a hood which is disposed over the receptacle, the sides of the hood being spaced from the run-ways.

2. An animal trap, a receptacle, a series of run-ways around the sides of the receptacle, a door in close proximity to one of the run-ways, and a hood which is disposed over the receptacle and over the run-ways, the sides of the hood being spaced from the run-ways.

In testimony whereof I have signed my name to this specification in the presence of two subscribing witnesses.

WILLIAM M. KAISER.

Witnesses:
G. E. PURVES,
J. H. PURVES